(12) United States Patent
Patil et al.

(10) Patent No.: US 11,494,334 B2
(45) Date of Patent: Nov. 8, 2022

(54) EMBEDDED REFERENCE COUNTS FOR FILE CLONES

(71) Applicant: VMware, Inc., Palo Alto, CA (US)

(72) Inventors: Sriram Patil, San Jose, CA (US); Abhay Kumar Jain, Cupertino, CA (US); Wenguang Wang, Santa Clara, CA (US); Nitin Rastogi, San Bruno, CA (US); Pranay Singh, San Ramon, CA (US); Richard P. Spillane, Mountain View, CA (US)

(73) Assignee: VMWARE INC., Palo Alto, CA (US)

( * ) Notice: Subject to any disclaimer, the term of this patent is extended or adjusted under 35 U.S.C. 154(b) by 42 days.

(21) Appl. No.: 17/119,959

(22) Filed: Dec. 11, 2020

(65) Prior Publication Data

US 2022/0188267 A1    Jun. 16, 2022

(51) Int. Cl.
| | |
|---|---|
| *G06F 17/00* | (2019.01) |
| *G06F 7/00* | (2006.01) |
| *G06F 16/11* | (2019.01) |
| *G06F 16/185* | (2019.01) |
| *G06F 16/174* | (2019.01) |

(52) U.S. Cl.
CPC ........ *G06F 16/128* (2019.01); *G06F 16/1748* (2019.01); *G06F 16/185* (2019.01)

(58) Field of Classification Search
CPC ... G06F 16/128; G06F 16/1748; G06F 16/185
USPC ............................................................ 707/692
See application file for complete search history.

(56) References Cited

U.S. PATENT DOCUMENTS

| | | | | |
|---|---|---|---|---|
| 8,812,450 | B1* | 8/2014 | Kesavan | G06F 16/17 707/656 |
| 9,424,185 | B1* | 8/2016 | Botelho | G06F 12/0253 |
| 2007/0106851 | A1* | 5/2007 | Bonwick | G06F 11/1435 711/170 |
| 2007/0226436 | A1* | 9/2007 | Cheng | G06F 11/1435 714/E11.119 |
| 2008/0235445 | A1* | 9/2008 | Kacin | G06F 9/4416 711/E12.001 |
| 2009/0313446 | A1* | 12/2009 | Schuba | G06F 12/0284 711/E12.059 |

(Continued)

OTHER PUBLICATIONS

T. Haynes, "Network File System (NFS) Version 4 Minor Version 2 Protocol", Internet Engineering Task Force (IETF), 104 pages, Nov. 2016.

(Continued)

*Primary Examiner* — Pavan Mamillapalli

(57) ABSTRACT

Techniques for efficiently managing a file clone from a filesystem which supports efficient volume snapshots are provided. In some embodiments, a system may receive an instruction to remove the file clone from the filesystem. The file clone may be a point-in-time copy of metadata of an original file. The system may further—for a file map entry in a filesystem tree associated with the file clone, the file map entry indicating a data block—decrement a reference count in a reference count entry associated with the file map entry. The reference count entry may be stored in the filesystem tree according to a key and the key may comprise an identification of the original file. The system may further reclaim the data block in a storage system when the reference count is zero.

21 Claims, 11 Drawing Sheets

(56) References Cited

U.S. PATENT DOCUMENTS

| | | | | |
|---|---|---|---|---|
| 2011/0161381 | A1* | 6/2011 | Wang | G06F 16/164 707/814 |
| 2012/0130949 | A1* | 5/2012 | Picken | G06F 16/128 707/626 |
| 2013/0262805 | A1* | 10/2013 | Zheng | G06F 3/0683 711/162 |
| 2016/0154834 | A1* | 6/2016 | Friedman | G06F 3/0604 707/657 |
| 2016/0350325 | A1* | 12/2016 | Wang | G06F 3/0608 |

OTHER PUBLICATIONS

Ashwin Pawar, "FAQ on SnapDiff", NetApp, 23 pages, Mar. 2016.
"Write Anywhere File Layout", Wikipedia, Retrieved from "//en. wikipedia.org/w/index.php?title=Write_Anywhere_File_Layout &oldid=972560983", 7 pages, Aug. 12, 2020.
Stefan Radtke, "Use Isilon's new change-list feature to accelerate your backus",Stefan Radtke's Blog, 10 pages, Jul. 22, 2014.
Torbjorn Granlund et al, "cp(1)-Linux manual page", Linux/UNIX system programming training, 4 pages, Aug. 13, 2020.
"Volume Shadow Copy Service", Microsoft Docs, 21 pages, Jan. 30, 2019.
"ZFS", Wikipedia, Retrieved from "//en.wikipedia.org/w/index.php? title-ZFS&oldid=978693503", 30 pages, Sep. 16, 2020.
Ohad Rodeh, "B-trees, Shadowing, and Clones", IBM Haifa Research Labs, ACM Transactions on Computational Logic, vol. V, No. N., 26 pages, Aug. 2007.
Ohad Rodeh et al., "BTRFS: The Linux B-tree Filesystem", IBM Research Report, RJ10501 (ALM1207-004), 37 pages, Jul. 9, 2012.
"Server-Side Copy", Wikipedia, Retrieved from "//wiki.samba.org/ index.php?title=Server-Side_Copy&oldid=16111", 6 pages, Sep. 18, 2020.
Related U.S. Appl. No. 16/920,490, filed Jul. 3, 2020 (unpublished), 41 pages.

* cited by examiner

100 HOST

110 FILESYSTEM

120 DISK STORAGE SYSTEM

130 SNAPSHOTS

140 SNAPSHOT AND CLONE PROCESSOR

FIG. 1

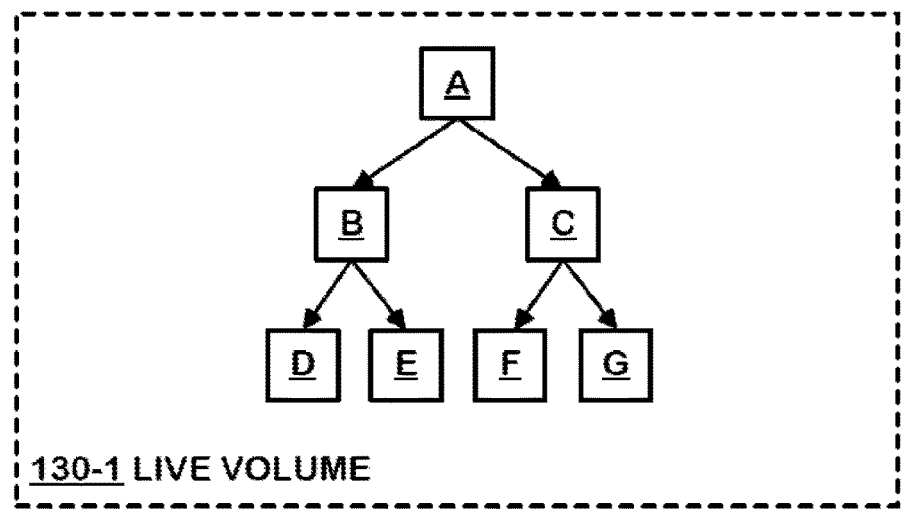
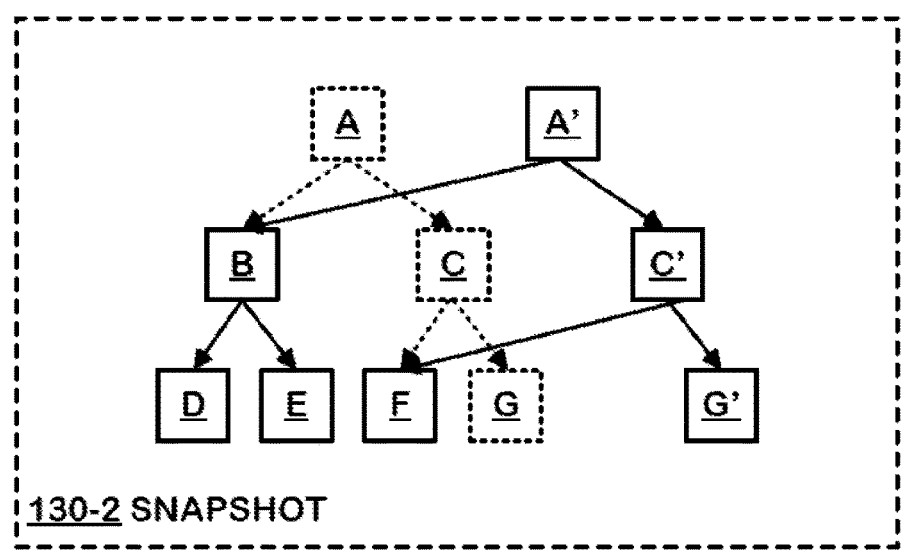
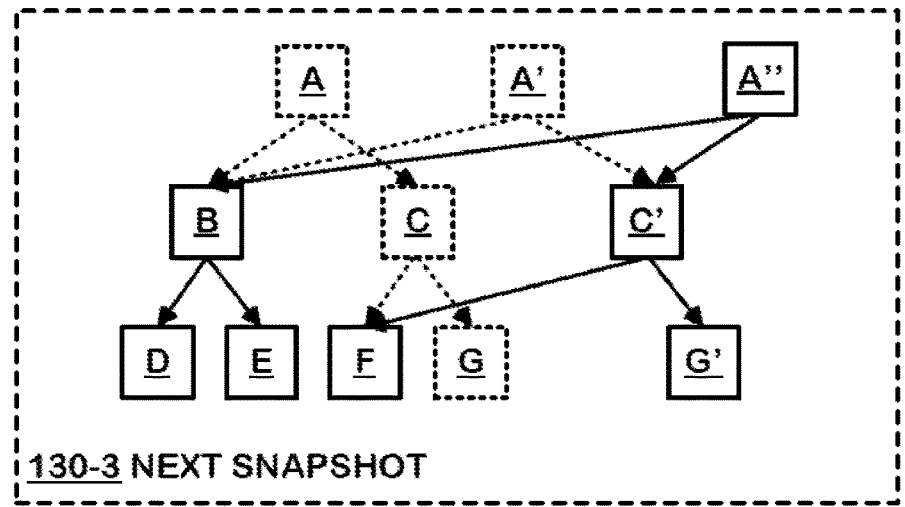
FIG. 2

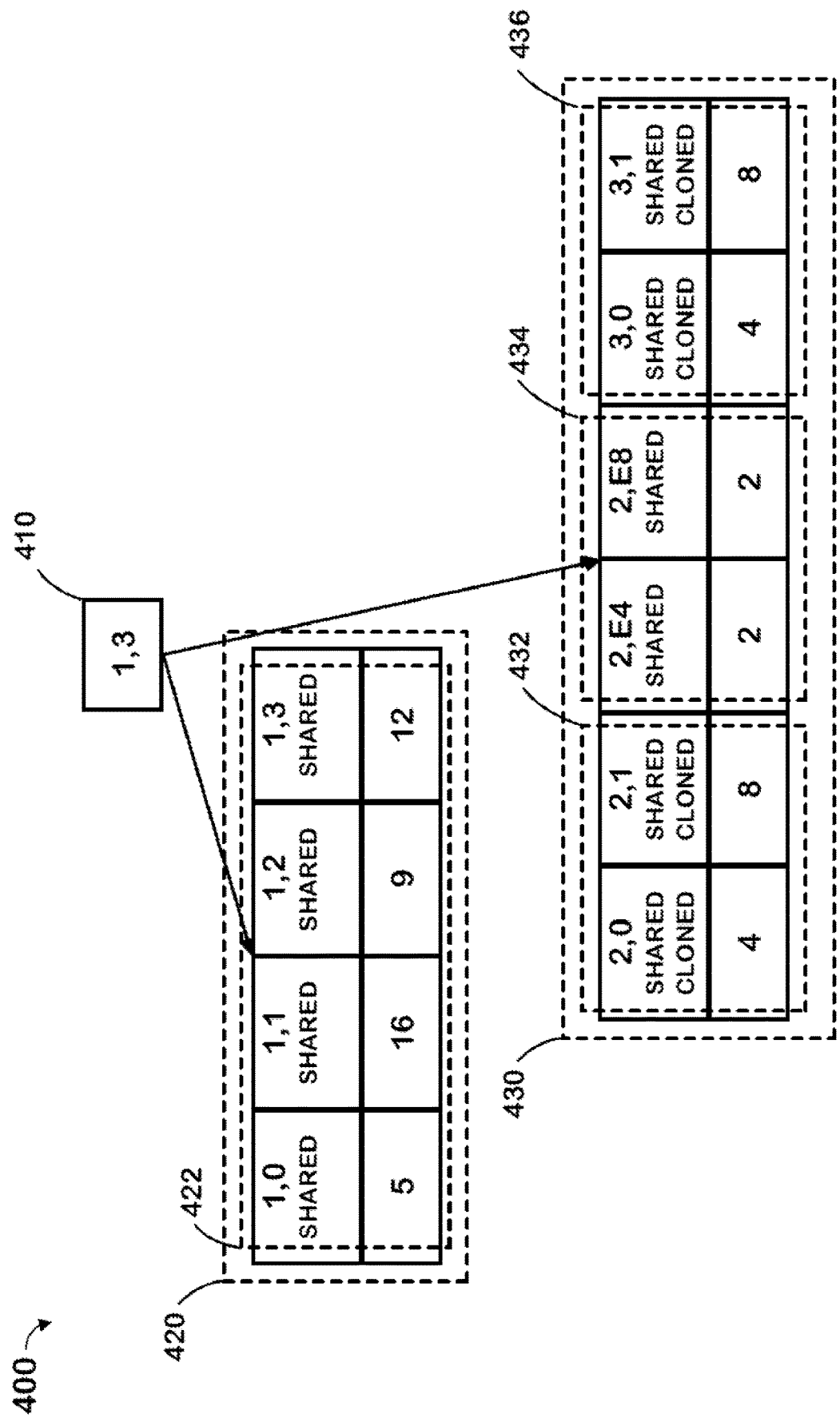

ns—that stores metadata about a file, such as its size, permissions, and the physical location of the file's data.

EMBEDDED REFERENCE COUNTS FOR FILE CLONES

BACKGROUND

Volume snapshots and file clones are important features of a storage system. A snapshot is a point-in-time copy of the volume's state. A snapshot stores metadata about the location of the volume's original data without actually copying the original data, minimizing the amount of data traffic (I/O) and the load required to create it compared to a full data copy. In this way, a snapshot offers a low-cost alternative to a full data copy for preserving the state of data and applications in a volume. Snapshots may be used for backup and disaster recovery. In a like manner, a file clone is a point-in-time copy of an individual file. A clone stores metadata about the location of the file's original data without copying the original file's data, resulting in a space-efficient copy of the file. These techniques allow for the sharing of data, while reducing overall storage costs and data duplication.

When snapshots and clones are deleted, it is desirable to release data blocks storing the actual data. A data block may be shared by multiple snapshots and clones; the snapshots and clones are said to refer to (use) the data block. A data block should be released when it is no longer referred to by any snapshot or clone. A reference count may be maintained for data blocks to track the number of snapshots or clones that refer to the data block. When no snapshots or clones refer to a data block (e.g., the reference count is 0), then the data block can be released. However, updating reference counts results in random writes to the key-value store that maintains the reference counts, resulting in degradation of filesystem performance.

BRIEF DESCRIPTION OF THE DRAWINGS

FIG. 1 is a simplified block diagram illustrating a system according to certain embodiments.

FIG. 2 depicts example filesystem trees according to certain embodiments.

FIG. 4 depicts an improved filesystem tree according to certain embodiments.

DETAILED DESCRIPTION

Figure 3:
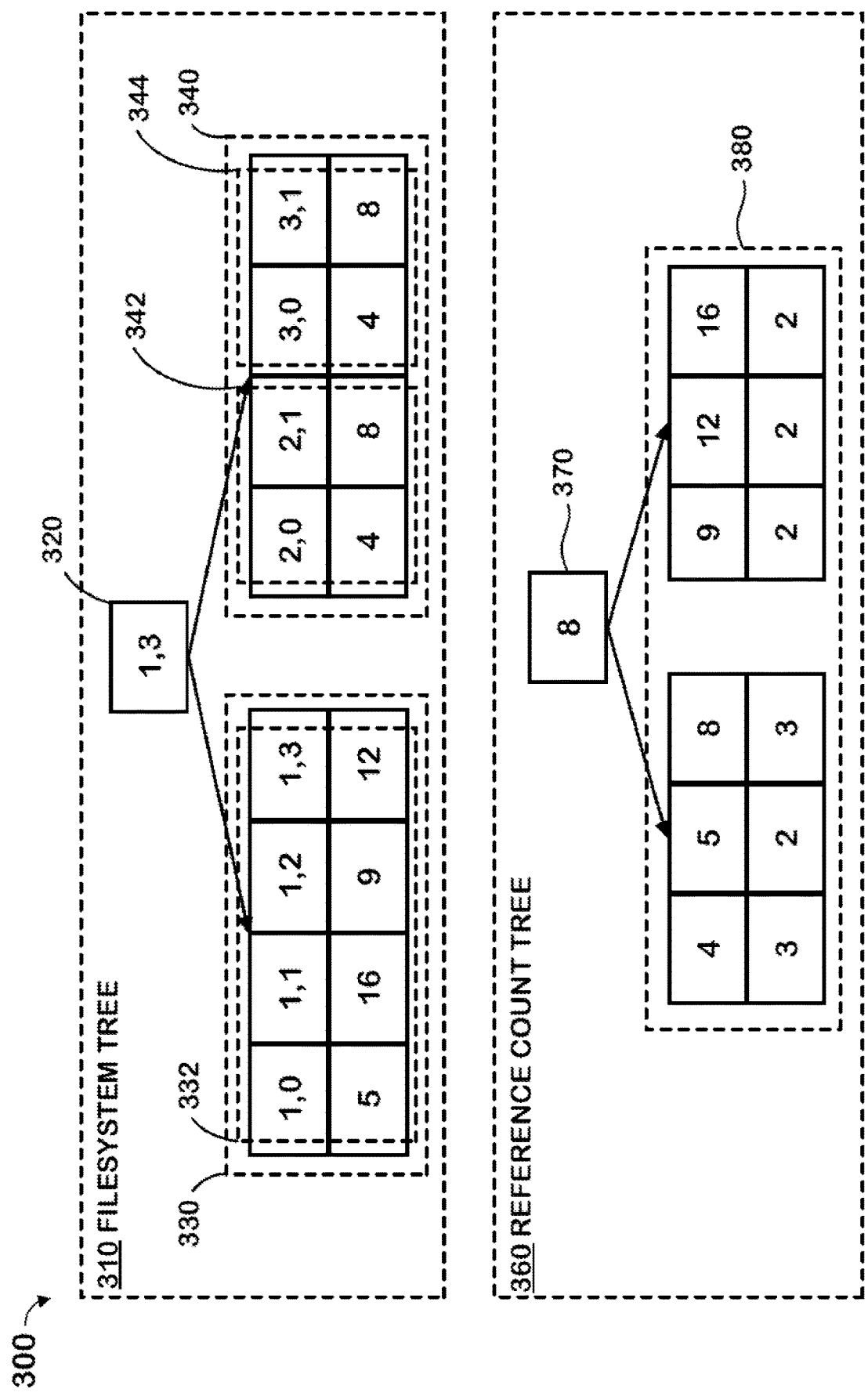
FIG. 3 depicts data structures according to certain embodiments.

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

I. OVERVIEW

The present disclosure describes techniques for maintaining reference counts in an I/O efficient manner for data blocks referred to by volume snapshots and file clones. Reference counts may be used to determine when data blocks may be released, so the data blocks can be overwritten with new data.

Instead of maintaining a separate key-value store for reference counts for snapshots and clones, the reference counts may be embedded in the filesystem tree. The conventional method uses a separate key-value store to maintain the reference counts where the physical block address is the key and thus the reference counts of a single file may be scattered throughout the key-value store. This approach requires numerous inefficient reads and writes (I/O overhead) across the filesystem tree to update the reference counts when a snapshot or clone is created or removed. In contrast, embedding the reference counts in contiguous file map entries in the filesystem tree advantageously localizes the reference counts, which can be more efficiently updated with less I/O overhead than the conventional approach.

Embodiments of the present technology may further improve filesystem operation with shared and cloned flags in the files map entries. The shared flag may be set when a data block is a part of a previous volume snapshot. The shared flag may eliminate the need for reference counts for snapshots. By checking previous and next snapshots, the filesystem can determine when data blocks are no longer used by any snapshot and may be released. A cloned flag is set in a corresponding file map entry when a file is cloned and a file clone is created. When the cloned flag is set and the file is deleted, the reference counts for corresponding data blocks may be updated. When the reference count reaches 0, the data block may be reclaimed.

II. SYSTEM ARCHITECTURE

FIG. 1 depicts host 100 for data storage according to some embodiments. In various embodiments, host 100 is a storage system for storing and retrieving data. For example, host 100 may be part of a virtual storage area network (VSAN), but different types of storage systems may be used. As shown, host 100 may include a filesystem 110, disk storage system 120, and snapshot and clone processor 140 (hereinafter processor). Filesystem 110 controls how files are stored in and retrieved from disk storage system 120. In some embodiments, filesystem 110 is a Portable Operating System Interface (POSIX) compliant system where data is organized in directories and files.

Disk storage system 120 can provide persistent (e.g., non-volatile) storage for program and data files, and can include a magnetic or solid-state hard disk drive, a removable flash memory-based drive or card, a Non-Volatile Memory Express (NVMe) device, a persistent memory device, and/or other types of storage media. A filesystem volume (hereinafter volume) can be stored in disk storage system 120. A volume (or logical drive) may be a single accessible storage area with a single filesystem. In various embodiments, disk storage system 120 includes filesystem trees 130. Filesystem trees 130 may include point-in-time copies of filesystem trees. Filesystem trees may store the filesystem state, such as logical to physical mappings for directories and files, that are stored in disk storage system 120. For example, filesystem trees may store inodes. An inode is a data structure—typically in a Unix-style filesystem—which stores the properties of a file and directories. By way of further example, a filesystem tree may be a copy-on-write (COW) B-tree.

Processor 140 processes volume snapshots and file clones (not depicted in FIG. 1) to track snapshots and file clones, and manage embedded reference counts for data blocks. Host 100 may include workloads (e.g., virtual machines and containers) on which processor 140 runs. Host 100 may further include hardware—such as one or more processors (e.g., x86, Arm®, etc.), memory (e.g., dynamic random access memory (DRAM), static random access memory (SRAM), electrically erasable programmable read-only memory (EEPROM), flash memory, persistent memory, etc.), network interface controller, and the like—for hosting the workloads.

III. SNAPSHOTS

FIG. 2 illustrates filesystem trees 130 in accordance with some embodiments. As shown, filesystem trees 130 include live volume 130-1, snapshot 130-2, and next snapshot 130-3. Filesystem trees 130 may include a representation of the active filesystem and be readable and writeable to reflect changes made during operation of the filesystem. Live volume 130-1 may be an active filesystem tree before a snapshot is taken. Snapshot 130-2 and 130-3 may include a snapshot and snapshots, respectively, and an active filesystem tree. In addition, snapshot 130-2 may be chronologically older than next snapshot 130-3, which means that snapshot 130-2 is created at an earlier point in time than next snapshot 130-3.

As shown, live volume 130-1 includes nodes A, B, C, D, E, F, and G. The active filesystem represented in snapshot 130-2 includes nodes A', B, C', D, E, F, and G'. The snapshot represented in snapshot 130-2 includes nodes A, B, C, D, E, F, and G. The active filesystem represented in next snapshot 130-3 includes nodes A", B, C', D, E, F, and G'. The snapshots represented in next snapshot 130-3 include A, B, C, D, E, F, and G. The snapshots represented in next snapshot 130-3 further include A', B, C', D, E, F, and G'. The nodes represent keys in the data structure.

According to some embodiments, the snapshots represented in snapshot 130-2 and next snapshot 130-3 may be each be a point-in-time copy of a filesystem tree that may record the filesystem state. Filesystem 110 may use filesystem trees 130 to store logical to physical mappings for directories and files. For example, the filesystem tree may stores keys, such as index nodes (inodes). Inodes may be a data structure in filesystem 110 that describe a filesystem object, such as a file or a directory. Each inode may store the attributes and disk block locations of the filesystem object's data. Filesystem object attributes may include metadata (e.g., date/time of last change, access, and modification), owner data, permission data, and the like. Usually, inodes do not store the file-system object's name or actual data. Directories (not shown in FIG. 2) includes lists of names assigned to inodes.

The disk block information may be a list of data blocks or extents for a file. The list of data blocks identifies locations in the filesystem where the file is located. Each data block in the list of data blocks may have a composite key number. The composite key number may be a composite key number comprising a filesystem object identifier and a file offset. The file offset may be the offset of the data block or extent within the file. The data blocks in the list of data blocks may be arranged in order (from smallest to largest) of their composite key numbers.

The filesystem tree (filesystem trees 130) may be stored in a data structure, such as a B-tree data structure. For example, B-trees may be a self-balancing tree data structure that keeps data sorted and allows searches, sequential access, insertions, and deletions. Here, sorted may mean that the nodes in the B-tree store keys (e.g., inodes) in ascending (from smallest to largest) order, but other meanings may be appreciated. The filesystem may use B-trees, because the use of B-trees reduces the number of disk reads to find a particular block in a disk.

According to various embodiments, the filesystem tree may be a copy-on-write (COW) B+ tree, but other types of filesystem trees may be used. When a directory or a file in the filesystem volume is changed, the filesystem updates the COW B+ tree. Whenever a data block is changed, the changed data is written to a new data block. COW B+ trees offer improved reliability. For example, since very little data needs to be overwritten in place, the possibility of a problem leading to data loss is reduced. In addition, filesystem-level snapshots may be efficiently created.

In the following example, live volume 130-1 represents the filesystem tree for the initial data from which a snapshot is taken. As shown, a snapshot of live volume 130-1 has not been taken, yet. In live volume 130-1, node A represents the live volume. A new snapshot begins with a new root node. When a snapshot of live volume 130-1 is taken creating snapshot 130-2, a copy of node A is created and called node A'. Node A' becomes the root of the active filesystem tree, replacing node A. In other words, node A' represents the live volume and node A represents the snapshot. Suppose a file/directory is changed and the key (e.g., inode) for the file/directory is in node G. Instead of changing node G in place, a whole new node G' is added—appended as shown in snapshot 130-2—to the active COW B-tree. Node G' is a copy of node G, except it has an updated inode for the changed file/directory. Node G' in effect replaces node G. Each parent node of node G (e.g., nodes C and A') may be updated. Node A' is updated to point to node G' instead of node G. Copies of nodes B, D, E, and F are not made, because these nodes have not changed. Accordingly, node B remains a child node of node A which is replaced by node A' and node F remains a child node of node C which is replaced by node C'.

When a parent node is updated, a whole new child node is similarly added to the active COW B-tree. Accordingly, node C' is added—appended as shown in snapshot 130-2—to the active COW B-tree. Node C' is a copy of node C, except it points to node G' instead of node G. Also, node C' replaces node C and node A' is updated to point to C' instead of node C. The active COW B-tree (e.g., snapshot 130-2) may be saved as a snapshot at any time. When the snapshot is saved, the whole B-tree is not necessarily copied. Instead, only the nodes that are modified (e.g., nodes A', C', and G') are advantageously copied. However, all previous snapshots may be needed for complete archiving or recovery of all the data.

When snapshot 130-2 represents the live volume and a snapshot is taken, node A" is created—it's a copy of node A'—and becomes the root of the active filesystem tree (represented by next snapshot 130-3), replacing node A'. In snapshot 130-2, node A represents the oldest snapshot, node A" represents the next snapshot, and node A'" is the live volume.

IV. REFERENCE COUNT TREE

FIG. 3 depicts conventional data structures 300 for maintaining reference counts in a filesystem. Data structures 300 may include filesystem tree 310 and reference count tree 360. The reference count may be maintained in reference count tree 360 and outside of filesystem tree 310. Filesystem tree 310 may be an active filesystem tree after one snapshot is taken. Three files—file 1, file 2, and file 3—are represented in filesystem tree 310. File 3 is a clone of file 2.

In filesystem tree 310, parent node 320 holds an identification (or identifier) for the filesystem object and a file offset, which are 1 and 3, respectively. Node 330 stores metadata for a filesystem object, in this case a file, having identification 1 (file 1). Node 340 stores metadata for two files having identification 2 and 3 (file 2 and file 3). The top of each file map entry in node 330 and node 340 stores an identification for the file and a file offset (e.g., 1,0; 1,1; 1,2; 1,3; 2,0; 2,1; 3,0; and 3,1). Node 330 includes four file map entries for file 1 (file 1 nodes 332) having offsets 0, 1, 2, and 3. Node 340 include two file map entries for file 2 (file 2 nodes 342) having offsets 0 and 1, and two nodes for file 3 (file 3 nodes 344) having offsets 0 and 1. The bottom of each file map entry in node 330 and node 340 stores a data block (or extent) number, which identifies the physical data block where the file data is stored. File 1 is in data blocks 5, 16, 9, and 12. File 2 is in data blocks 4 and 8. File 3, which is a clone of file 2, is also in data blocks 4 and 8. Although two nodes, node 330 and node 340, are depicted as storing metadata for file 1, file 2, and file 3, the metadata for these files may be stored in more nodes or fewer nodes.

Reference count tree 360 may be a key-value store in which reference counts for file objects—here file 1, file 2, and file 3—are maintained. In some embodiments, an original file will have a reference count of 1. Each subsequent snapshot and file clone may increment the reference count, such as by an increment of 1. Here, a snapshot was already taken and file 2 was cloned. Parent node 370 holds a data block number of 8. The top of each entry in nodes 380 holds a data block number as the key and a reference count as the value. For example, each data block of file 1 has a reference count of 2, because one snapshot was taken. Accordingly, blocks 5, 16, 9, and 12 which store file 1 have a reference count of 2. Because one snapshot was taken and one file clone (file 3) was created of file 2, data blocks used by file 2 and file 3—data blocks 4 and 8—have a reference count of 3.

Data blocks corresponding to a large file clone may be spread out across multiple physical data blocks. For example, the file may be fragmented, and its data blocks may not be contiguous. Accordingly, the reference counts for the data blocks used by the large file may be scattered across multiple nodes in the reference count tree. Recall that the reference count tree is keyed by data block number. When a file cloned and the original/clone is deleted, reads and writes of random nodes throughout the reference count tree may result, which is input/output (I/O) intensive and can degrade performance of the storage system.

V. EMBEDDED REFERENCE COUNTS

FIG. 4 depicts an enhanced filesystem tree, filesystem tree 400, for maintaining reference counts according to some embodiments. Like the example of FIG. 3, filesystem tree 400 may be an active filesystem tree after one snapshot is taken. Three files—file 1, file 2, and file 3—are represented in filesystem tree 400. File 3 is a clone of file 2. As shown, parent node 410 is the root node of filesystem tree 400. Because filesystem tree 400 is a two-level B-tree, nodes 420 and 430 are child nodes of parent node 410 and leaf nodes of filesystem tree 400.

Also like the example of FIG. 3, parent node 410 stores an identification (or identifier) for the file and a file offset, which are 1 and 3, respectively. The identification for the file may be a number (file identification number). Node 420 comprises file 1 entries 422 that store metadata for file 1. Node 430 stores file 2 entries 432 that store metadata for file 2 and file 3 entries 436 that store metadata for file 3. The top of each entry in file 1 entries 422, file 2 entries 432, and file 3 entries 436 respectively stores an identification for the file and a file offset (e.g., 1,0; 1,1; 1,2; 1,3; 2,0; 2,1; 3,0; and 3,1). The identification for the file in the file map entry may serve as a key for indexing (organizing/arranging) the file map entries in filesystem tree 400. File 1 entries 422 comprise four entries having offsets 0, 1, 2, and 3. File 2 entries 432 comprise two entries for file 2 having offsets 0 and 1. File 3 entries 436 comprise two entries for file 3 having offsets 0 and 1. The bottom of each entry in file 1 entries 422, file 2 entries 432, and file 3 entries 436 respectively stores a data block number, which identifies a physical data block where the file data is stored. File 1 is in data blocks 5, 16, 9, and 12. File 2 is in data blocks 4 and 8. File 3 is also in data blocks 4 and 8. Although two nodes, node 420 and node 430, are depicted as storing metadata entries for file 1, file 2, and file 3, the metadata entries for these files may be stored in more nodes or fewer nodes.

Filesystem tree 400 adds two flags to the top of file 1 entries 422, file 2 entries 432, and file 3 entries 436: a shared flag and a cloned flag. In some embodiments, each of the shared flag and cloned flag stores information, such as a bit, where a first value (e.g., 1 (or 0)) denotes the flag is set (the file is cloned or is a clone) and a second value (e.g., 0 (or 1)) denotes the flag is not set (the file is not cloned and is not a clone). The shared flag advantageously acts as (and replaces) a reference count for volume snapshots. The shared flag indicates that the data block identified in a node is shared with an earlier snapshot. Each snapshot in a series of snapshots is based on an earlier snapshot, unless it is the first snapshot of a volume. For example, snapshot 130-2 is based on live volume 130-1 and next snapshot 130-3 is based on snapshot 130-2. Processor 140 may determine whether a data block can be released by knowing through the shared flag whether not a data block is shared with a preceding and next snapshot. Since filesystem tree 400 is an active filesystem tree after one snapshot is taken, the shared flag in each of nodes 420 and nodes 430 is set.

When a file clone is created, processor 140 sets the cloned flag in file map entries of the filesystem tree corresponding to the original file and file clone. For example, file 2 entries 432 and file 3 entries 436 have the cloned flag set. File 1 entries 422 do not have their cloned flag set, because in this example file 1 is not cloned or a clone.

A reference count for file clones may be embedded in filesystem tree 400. The embedded reference count may maintain a reference count for the data blocks of cloned files. The embedded reference count may be an additional entry in the same filesystem tree as the filesystem tree that stores the metadata for the cloned (original) file. As shown, the embedded reference count for file 2 may be embedded reference count entries 434. Embedded reference count entries 434 may be contiguously stored adjacent to the file map entries for file 2 (file 2 entries 432)—because they are advantageously indexed by a composite key that includes the file identification number. These additional entries may be created when an original file is first cloned and updated when subsequent file clones are created and deleted.

In the example of FIG. 4, embedded reference count entries 434 include two nodes. The top of each embedded reference count entry is a composite key comprising a file identification number and a data block number. Here, the file identification number indicates file 2. File 2 uses two data blocks, data blocks 4 and 8. So, the data block numbers in embedded reference count entries 434 are 4 and 8, denoted by E4 and E8, respectively. Embedded reference count entries 434 may not have a cloned flag, since entries 434 do not represent a file that would be cloned.

Embedded reference count entries 434 inherit the shared flag status from the original file. Recall that the shared flag indicates whether the data block appears in an earlier snapshot. Since a snapshot was already taken in this example and thus data blocks 4 and 8 (denoted by E4 and E8 in the composite key) used by file 2 are shared, embedded reference count entries 434 have the shared flag set. For a filesystem tree that does not have a previous snapshot (the shared flag is not set in the file map entries) and does include a file clone, processor 140 may set the shared flag in the embedded reference count entries in the active filesystem tree after a snapshot is taken.

The bottom of each embedded reference count entry comprises a reference count. The reference count may start at 1 for the original file. Processor 140 may increment the reference count by 1 for each file clone created. Since there is one file clone (file 3) of file 2, the reference count is 2. When a file clone is removed, processor 140 may decrement the reference count by 1. When the reference count reaches 0, processor 140 may release the data blocks used by the file.

According to various embodiments, the reference count may be advantageously stored in the filesystem tree (filesystem tree 400), instead of a separate key-value store (reference count tree 360). Since embedded reference count entries use a composite key comprised of a file identification number and a physical data block number, the embedded reference count entries may be stored contiguously (e.g., next to each other as shown for embedded reference count entries 434) in filesystem tree 400 and very likely in the same node (e.g., node 430), even though the block numbers may be sparse or random. In other words, indexing (arranging/organizing in the filesystem tree) by file identification number (here, the number is 2) (and then physical data block number) may keep embedded reference count entries 434 contiguous and adjacent to file 2 entries 432. In contrast, in FIG. 3, nodes 380 in reference count tree 360 are indexed by data block number. Since the physical data blocks may be spread throughout a filesystem volume, the data block numbers may be random. Indexing by these random data block numbers may spread the reference counts for data blocks of a cloned file across multiple nodes and throughout reference count tree 360. Typically, a file clone is local to a filesystem volume, so the embedded reference count nodes may be reasonably maintained in the same filesystem tree. When a file clone is created or removed, processor 140 may efficiently update the reference count in the contiguous embedded reference count entries, avoiding the inefficient reads and writes (I/O overhead) suffered by the separate key-value store.

VI. CREATING VOLUME SNAPSHOTS

Figure 5A:
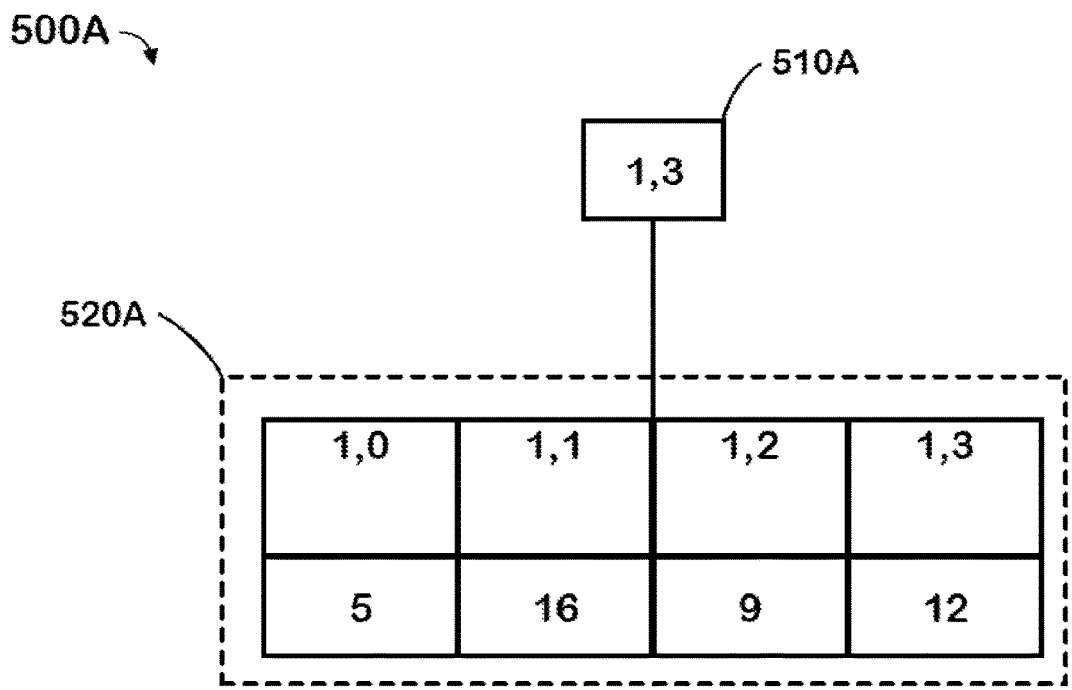
FIGS. 5A and 5B illustrate generating a snapshot according to certain embodiments.
Figure 5B:
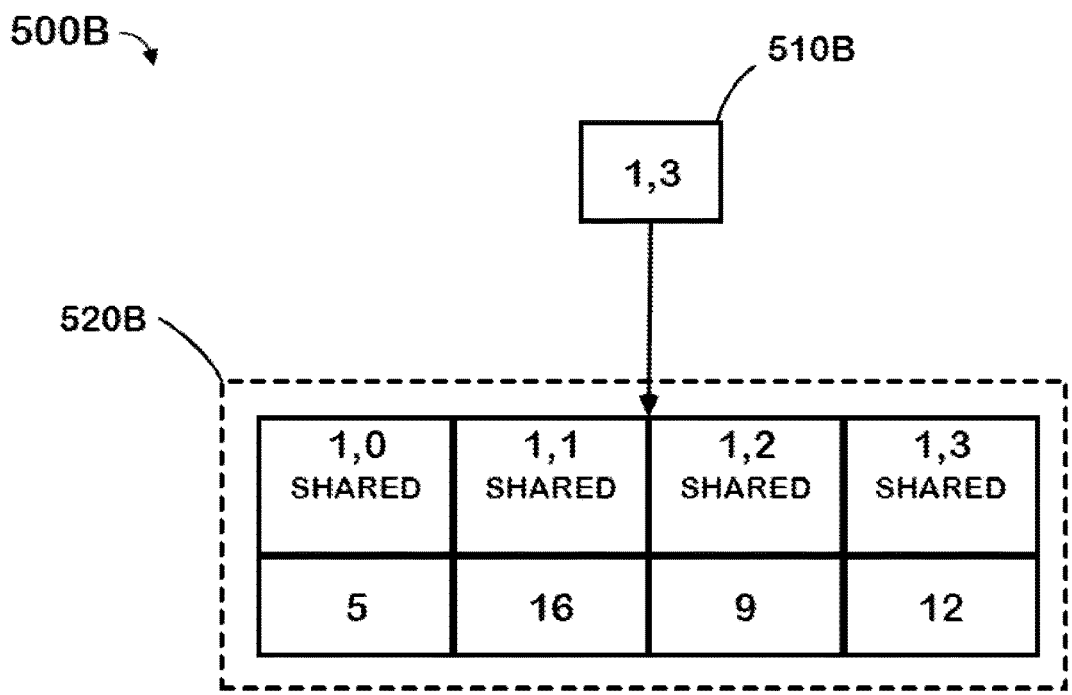

FIG. 5A illustrates filesystem tree 500A for file 1 before a snapshot is taken. FIG. 5B shows filesystem tree 500B for file 1 after the snapshot is taken. Filesystem trees 500A and 500B are similar to filesystem tree 400. Filesystem tree 500A includes parent node 510A and node 520A. Filesystem tree 500B includes parent node 510B and node 520B. File map entries in node 520A do not have the shared flag set, because a snapshot of filesystem tree 500A has not been taken, yet. File map entries in node 520B have the shared flag set, because filesystem tree 500B is the filesystem tree after a snapshot is taken of filesystem tree 500A. Although the file map entries are shown in one node in FIGS. 5A and 5B, the file map entries may be in more than one node.

Figure 6:
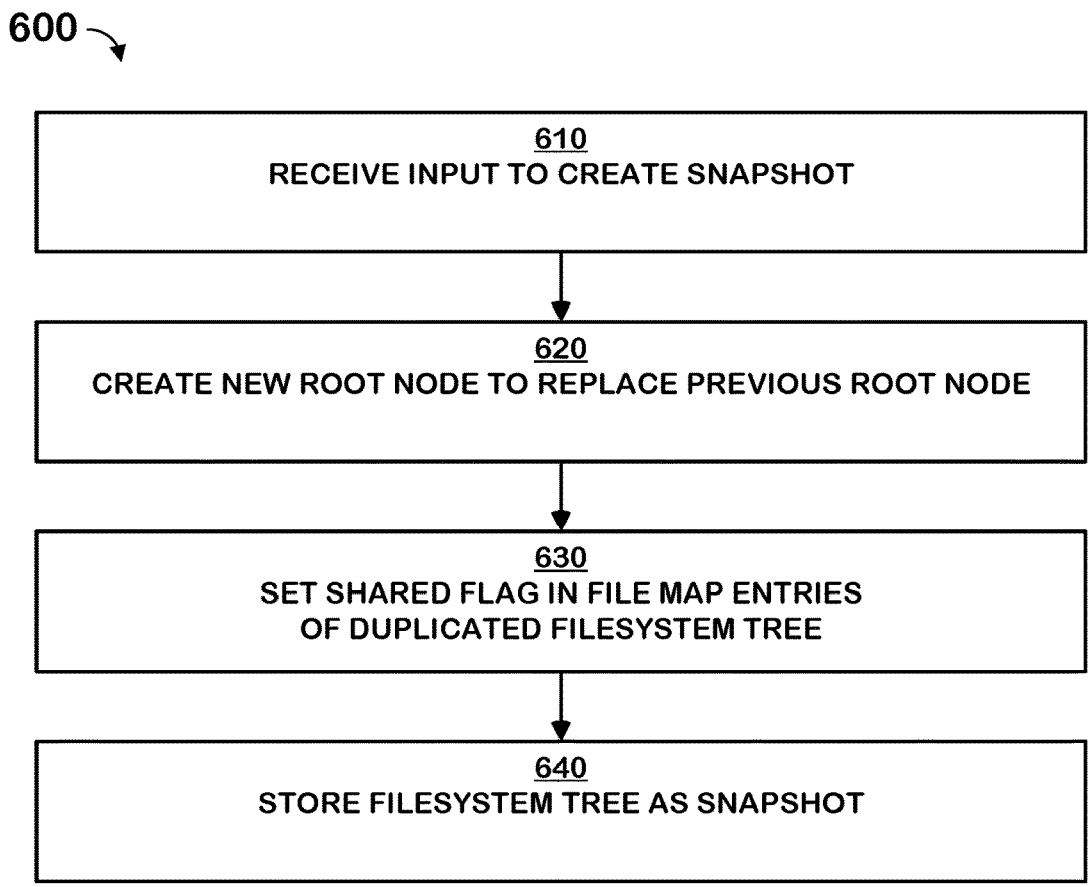
FIG. 6 is a flow diagram showing a method for creating a snapshot, according to certain embodiments.

FIG. 6 depicts workflow 600 that may be executed by host 100 to create a snapshot according to some embodiments. Although workflow 600 is described in conjunction with host 100, other systems may be used to perform the methods described herein. Workflow 600 is also described with reference to FIGS. 2, 5A, and 5B.

Workflow 600 may commence at 610 where processor 140 may receive an input directing it to create a snapshot of an active filesystem tree. For example, the input may be an instruction from a backup system or a user. At 620, processor 140 may create a new root node for the filesystem tree that replaces the original root node. Suppose the active filesystem tree is represented by node A' in snapshot 130-2. To create a new root node, a copy of root node A' in snapshot 130-2 is made and named node A" in next snapshot 130-3. Next snapshot 130-3 represents the filesystem tree after a snapshot is taken of the filesystem tree shown of snapshot 130-2. In next snapshot 130-3, node A' represents the snapshot and node A" represents the live volume.

At 630, processor 140 may set the shared flag in the file map entries in the snapshot. In the example of FIGS. 5A and 5B, before the snapshot is taken in FIG. 5A, the shared flag is not set. When the snapshot is generated, the shared flag may be set as shown in FIG. 5B. At 640, processor 140 may store the generated snapshot, for example, in disk storage system 110.

VII. CREATING FILE CLONES

Figure 7A:
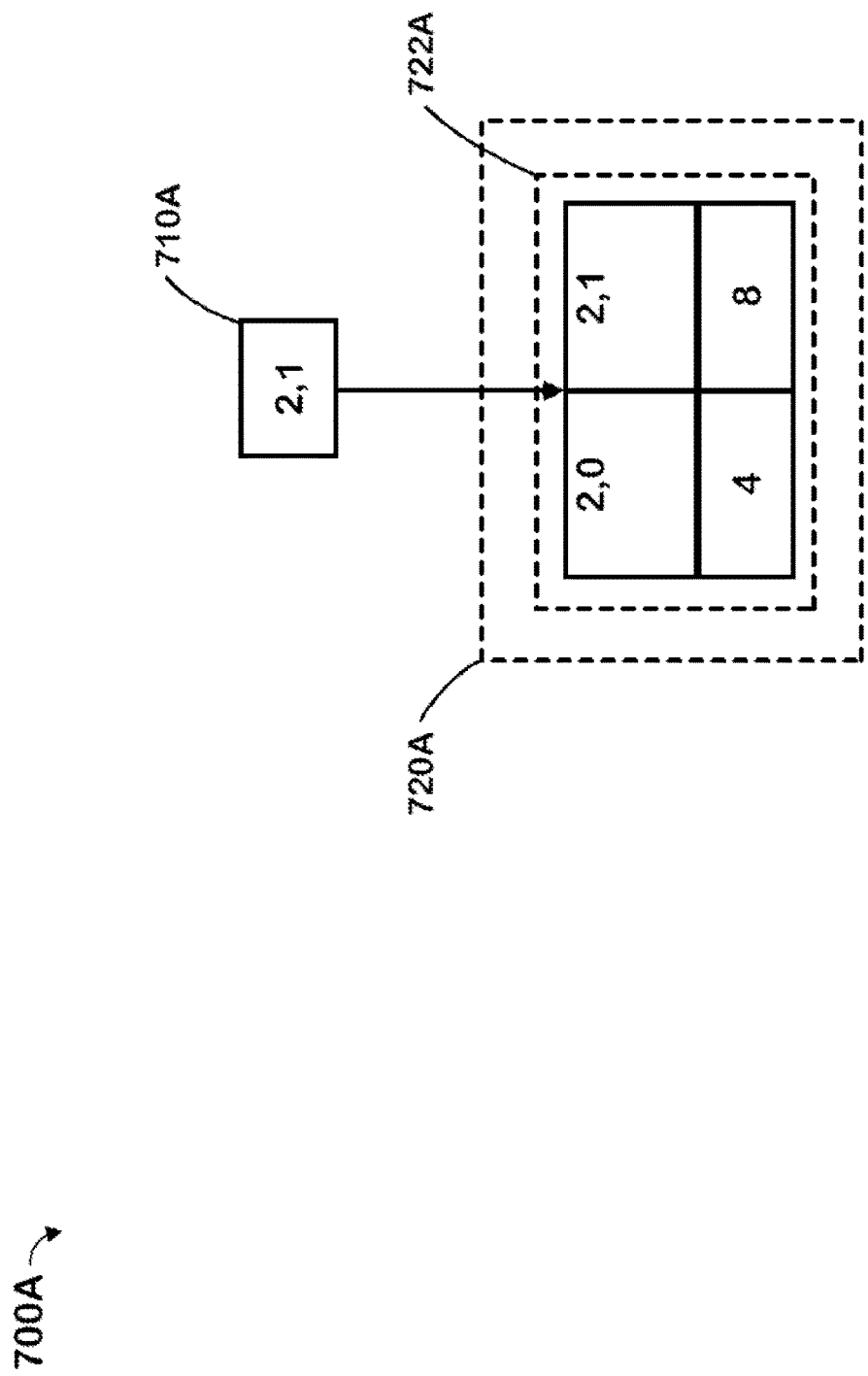
FIGS. 7A and 7B illustrate creating a file clone.
Figure 7B:
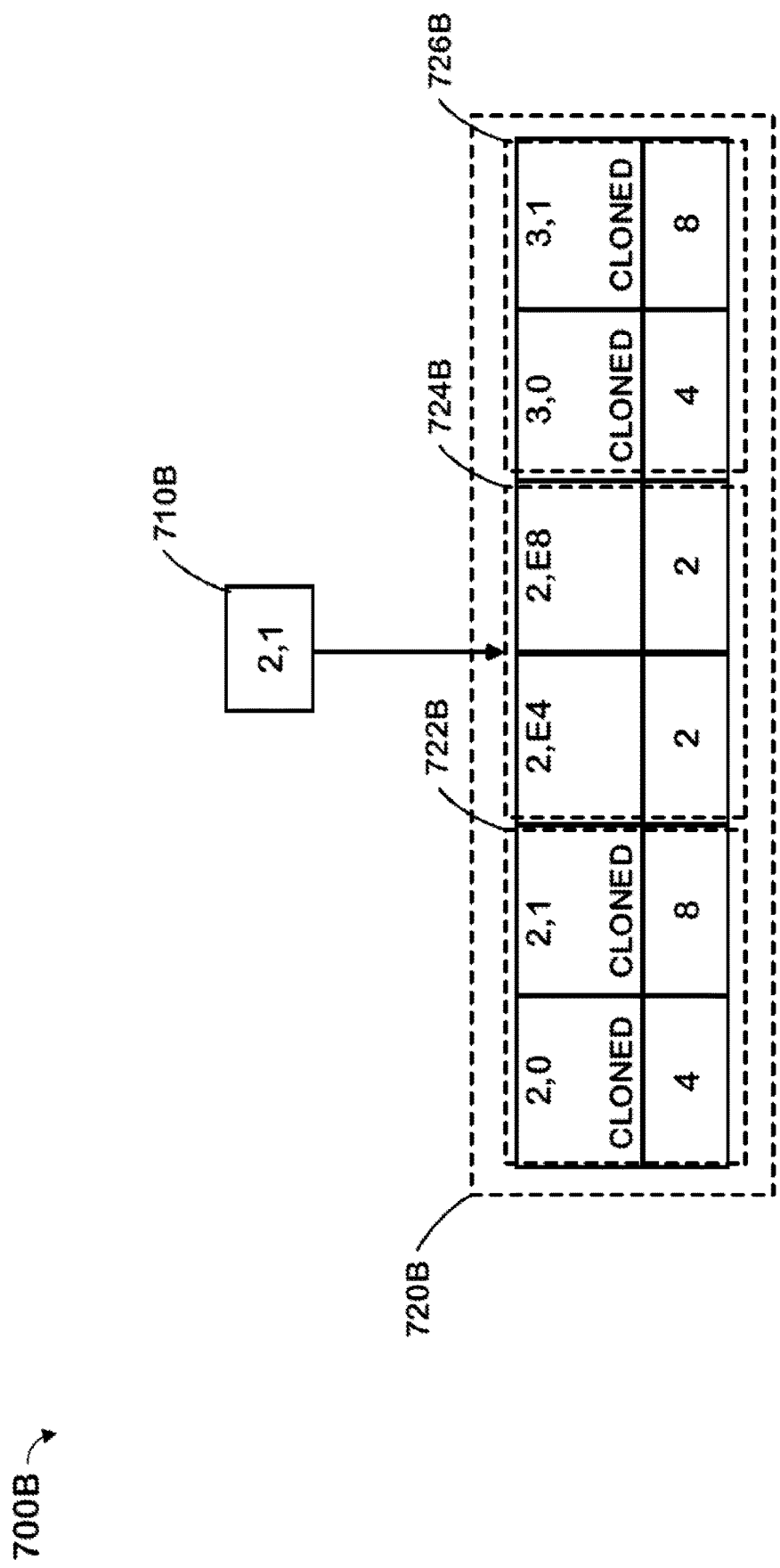

FIG. 7A shows filesystem tree 700A before file 2 is cloned according to some embodiments. FIG. 7B shows filesystem tree 700B after file 2 is cloned to produce file 3 according to some embodiments. Filesystem trees 700A and 700B are similar to filesystem tree 400. Filesystem tree 700A includes parent node 710A and node 720A. Filesystem tree 700B includes parent node 710B and node 720B. In file 2 entries 722A, the cloned flag is not set, because file 2 has not been cloned, yet. In file 2 entries 722B, the cloned flag is set, because file 2 has been cloned to produce file 3. File 3 is represented by file 3 entries 726B. To keep track of the clones of file 2, embedded reference count entries 724B are also in node 720B. Although the file map entries and embedded reference count entries are depicted as being in one node in FIGS. 7A and 7B, the file map entries and embedded reference count entries may be in more than one node.

Figure 8:
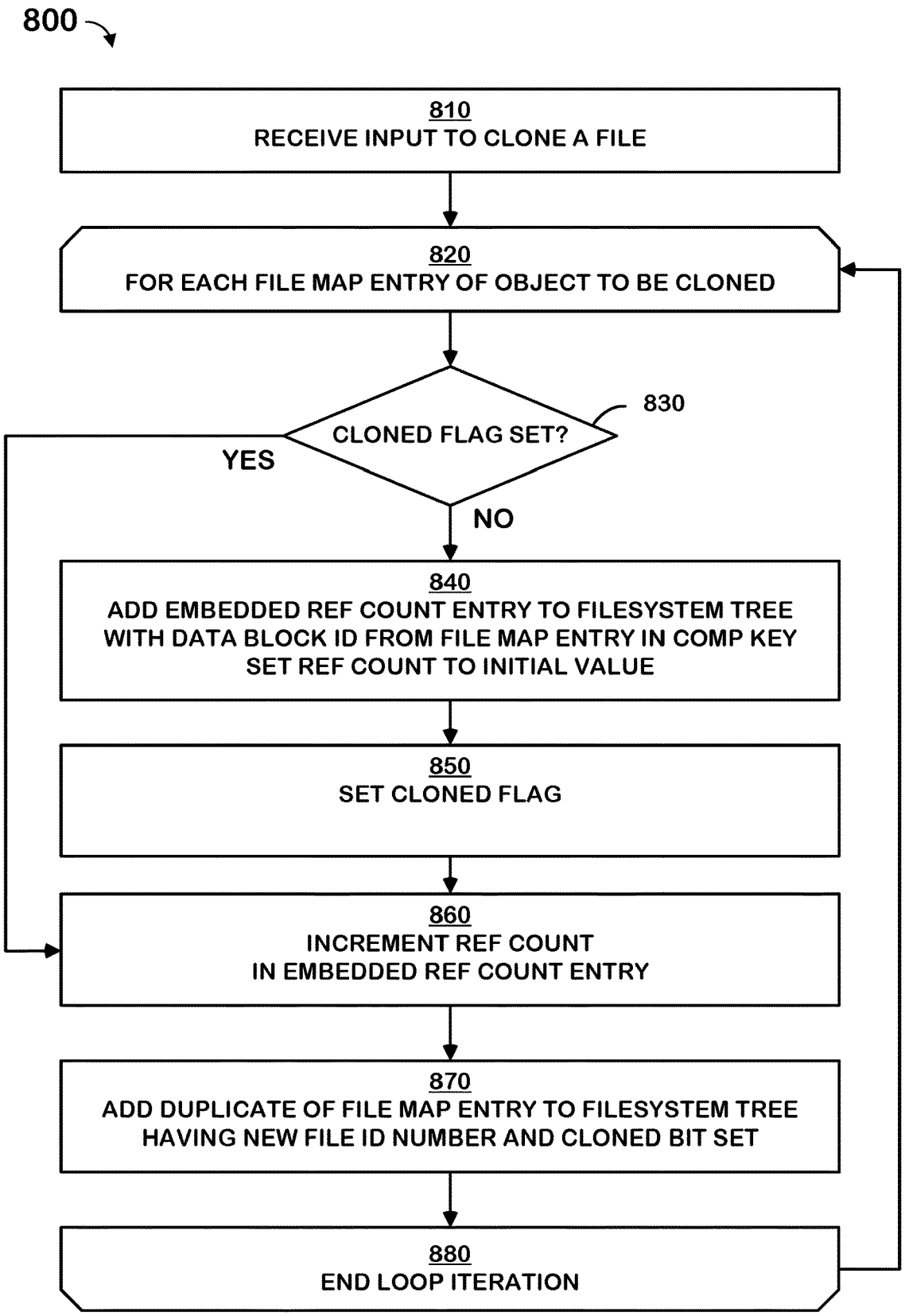
FIG. 8 is a flow diagram showing a method for cloning a file, according to certain embodiments.

FIG. 8 illustrates workflow 800 for cloning a file. Although workflow 800 is described in conjunction with host 100, other systems may be used to perform the described methods. Workflow 800 is also described with reference to FIGS. 7A and 7B. At 810, host 100 may receive an input to clone a file. For example, the input may be an instruction from a user.

At 820, processor 140 may enter a loop for each file map entry of the file to be cloned. As shown in the example of FIG. 7A, file 2 has two file map entries, so the loop would be performed twice. Within the loop, at 830, processor 140 checks whether the cloned flag is set in the file map entry. In other words, processor 140 evaluates whether the file to be cloned has already been cloned or is itself a clone. If so, an embedded reference count entry was already added to the filesystem tree for the data block. Otherwise, the file is being cloned for the first time. When the cloned flag is set, processor 140 proceeds to step 860. When the cloned flat is not set, processor 140 proceeds to step 840.

At 840, processor 140 adds an embedded reference count entry to the filesystem tree. The embedded reference count entries created for a file with each iteration of the loop may be contiguous and very likely be in the same node. As shown in the example of FIG. 7B, two embedded reference count entries are created, corresponding to the two file map entries associated with file 2. The data block number in each file map entry is placed in the composite key number of the corresponding embedded reference count entry. For example, data block 4 is shown as E4 and data block 8 is shown E8. Note that the cloned flag may not be set in the embedded reference count entries, because the embedded reference count entries do not represent a file that would be cloned. The bottom of each embedded reference count entry comprises a reference count. The initial value for reference count may start at 1 for the original file.

At 850, processor 140 may set the cloned flag in the file map entry, to denote that the data block in the file map entry is part of a file clone. At 860, processor 140 may increment the reference count in the embedded reference count, for example, by 1. For example, embedded reference number entries 724B have a reference count of 2, with 1 for original file 2 and 1 for clone file 3.

At 870, processor 140 may add a file map entry to the filesystem for the file clone. Processor 140 may copy the file map entry with the cloned flag set and the file identification number changed to a new file identification for the clone. Alternatively, processor 140 may copy the file map entry without the cloned flag set and then set the cloned flag. In the example of FIG. 7B, clone file 3 has file map entries 726B. Following 870, processor 140 terminates the current loop iteration (880).

VIII. REMOVING VOLUME SNAPSHOTS

Figure 9:
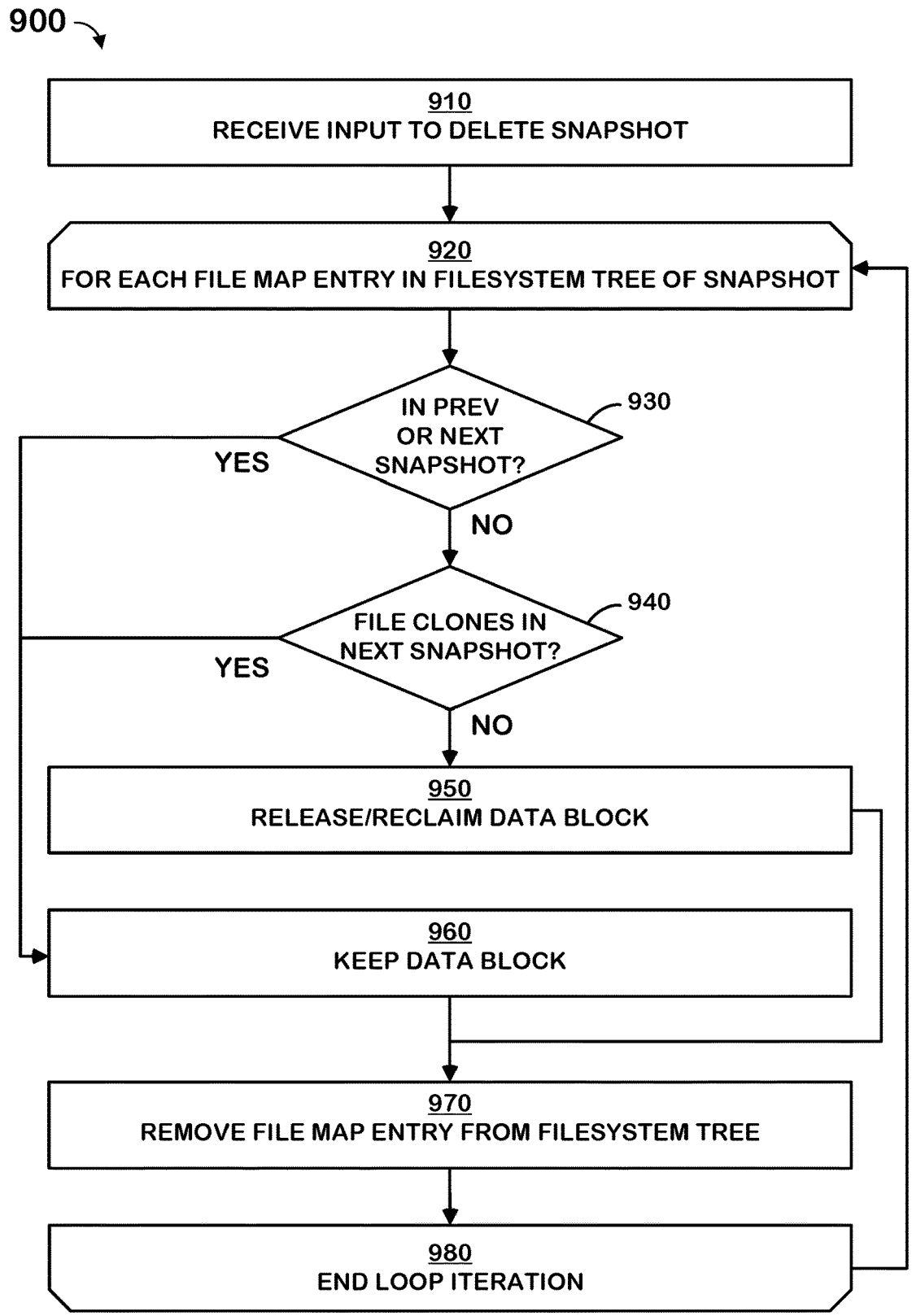
FIG. 9 is a flow diagram showing a method for removing a snapshot, according to certain embodiments.

FIG. 9 illustrates workflow 900 for removing a snapshot according to some embodiments. A filesystem tree node (and the file map entries stored therein) in a snapshot may not be removed unless both the previous and next snapshot do not refer to the node. As described below, some embodiments advantageously do not store a separate reference count for nodes in snapshots and instead scan the previous and next snapshot. Although workflow 900 is described with reference to host 100, other system may be used to perform the described methods. Workflow 900 is also described with reference to FIGS. 2 and 4. Workflow 900 may commence at 910 where processor 140 may receive an input to delete a snapshot. For example, the input may be an instruction from a backup system or a user.

At 920, processor 140 may enter a loop for each file map entry (and its data block) in the snapshot. At 930, processor 140 determines if the file map entry is present in the previous or next snapshot. If the previous snapshot and/or the next snapshot refer to the data block, the data block may not be released. In the example of next snapshot 130-3, suppose node A represents the previous snapshot, node A' represents the snapshot to be removed, and node A" represents the next snapshot. When the snapshot represented by node A' is to be removed, then processor 140 would check previous snapshot represented by node A and next snapshot represented by node A" for the file map entry. If the data block is present in either the previous snapshot or the next snapshot, then the data block is presumed to be shared. The determination for the previous snapshot may check if the shared flag is set in the file map entry. If the shared flag is set in the file map entry, then the data block is referred to in the previous snapshot.

Processor 140 may perform this evaluation (930) at the node level. Suppose again that in next snapshot 130-3, node A represents the previous snapshot, node A' represents the snapshot to be removed, and node A" represents the next snapshot. Root node A' is uniquely associated with only one snapshot, so node A' may be removed and data blocks used by node A' may be released. Nodes B, C', D, E, and G' may still be used by another snapshot. So, the previous snapshot having root node A and the next snapshot having root node A" are scanned. Node A' refers to node B. Node A also refers to node B. Nodes from node B onward (nodes D and E) are shared with the previous snapshot, and the data blocks used by nodes D and E may not be released. Node A' refers to node C'. Node A" refers to node C', too. Nodes below node C' (nodes F and G') are shared with the next snapshot, and the data blocks used by nodes F and G' may not be released. When deleting the snapshot having root node A', the data blocks used by node B and its children, and the data block used by node C' and its children may not be released when the snapshot having root node A' is deleted. Thus, only data blocks corresponding to node A' may be released when the snapshot having root node A' is removed.

When the data block is in the previous and/or next snapshot, processor 140 may proceed to 960. When the data block is not in the previous and/or next snapshot, processor 140 may proceed to 940.

At 940, processor 140 may determine if a file clone in the next snapshot refers to the data block. For example, processor 140 may determine whether the reference count in the embedded reference count entry for the data block in the next snapshot is non-zero. Suppose file 2 is present in the snapshot to be removed. In the next snapshot, file 2 is cloned and then file 2 is deleted. Here, file 2 is no longer present in the next snapshot (and would not be caught by 930), but clones of file 2-which need file 2's data blocks—are. When the reference count for the data block is non-zero, processor 140 proceeds to 960. Otherwise, processor 140 proceeds to 950.

At 950, processor 140 may release/reclaim the data block. At 960, processor 140 may keep/retain the data block (does not release/reclaim the data block). At 970, processor 140 may remove the file map entry from the snapshot. In this way, the snapshot may be removed one file map entry at a time. Following 970, processor 140 may end the current loop iteration at 980.

IX. REMOVING FILE CLONES

Figure 10:
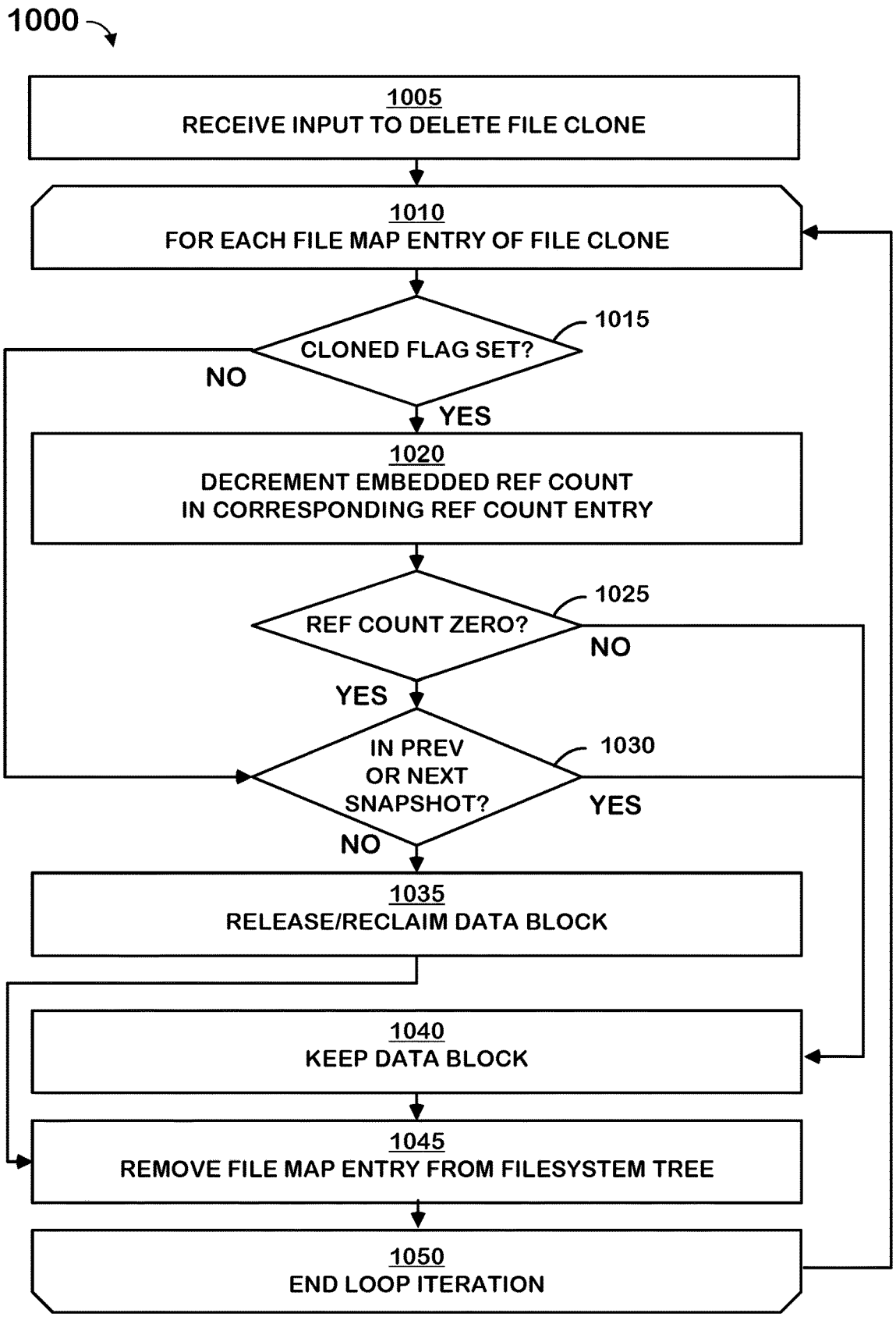
FIG. 10 is a flow diagram showing a method for removing a file clone, according to certain embodiments.

FIG. 10 illustrates workflow 1000 for deleting a file clone according to various embodiments. As described below, embedded reference counts may be advantageously used to determine when data blocks used by a cloned file may be released. Although workflow 1000 is described with reference to host 100, other system may be used to perform the described methods. Workflow 1000 is also described with reference to FIG. 4. Workflow 1000 may commence at 1005 where processor 140 may receive an input to delete a file clone. For example, the input may be an instruction from a user. Although "file clone" is used in this description, it may be the original file—from which a clone is made—that is being deleted.

At 1010, processor 140 may enter a loop for each file map entry (and its data block) of the file clone. Within the loop, at 1015 processor 140 may check whether the clone flag is set. In other words, processor 140 may determine if the data block is referred to by a file clone. When the clone flag is set, processor 140 proceeds to 1020. When the clone flag is not set, processor 140 proceeds to 1030.

At 1020, processor 140 decrements the reference count in the embedded reference count entry corresponding to the data block. Since a file clone is being deleted, there will be one fewer file clone and the reference count may be reduced by 1. At 1025 processor 140 determines if the reference count for the data block is 0. When the reference count is 0, there are no more file clones. In this case, file clone to be deleted is the last one in the present file tree/snapshot. When the reference count is not 0, processor 140 may proceed to 1040. When the reference count is 0, processor 140 may proceed to 1030.

At 1030, processor 140 may check if the file block is referred to in the previous snapshot or the next snapshot. The evaluation of 1030 has many of the same characteristics as 930 in FIG. 9, as described above.

At 1035, processor 140 may release/reclaim the data block. In addition, the embedded reference count entry corresponding to the data block may be removed from the filesystem tree. At 1040, processor 140 keeps/retains the data block (e.g., does not release/reclaim the data block). At 1045, processor 140 may remove the file map entry in the filesystem tree, since the file clone is to be removed. Following 1045, processor 140 may terminate the current loop iteration (1050).

X. CONCLUSION

Embodiments of the present technology use an improved filesystem tree and flags to determine when data blocks shared by volume snapshots and file clones may be released/recovered.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), NVMe device, persistent memory device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments and are presented to illustrate the flexibility and advantages of the present disclosure as defined by the following claims. Based on the above disclosure and the following claims, other arrangements, embodiments, implementations, and equivalents may be employed without departing from the scope of the disclosure as defined by the claims.

What is claimed is:

1. A method for removing a file clone from a filesystem comprising:

receiving an instruction to remove the file clone from the filesystem, wherein the file clone is a point-in-time copy of metadata of an original file;

for a file map entry in a filesystem tree associated with the file clone, the file map entry identifying a data block:

decrementing a reference count in a reference count entry associated with the file map entry, wherein the reference count entry is stored in the filesystem tree according to a key and the key comprises an identification of the original file; and reclaiming the data block in a storage system based on the reference count, wherein the data block is reclaimed when the reference count is zero.

2. The method of claim 1, further comprising:

for the file map entry in the filesystem tree associated with the file clone:

reclaiming the physical block in the storage system associated with the file map entry further based on at least one snapshot of the filesystem tree, wherein the data block is reclaimed when the reference count is zero and the physical block is not shared with the at least one snapshot of the filesystem tree, wherein the previous snapshot and the next snapshot are a point-in-time copies of the filesystem tree.

3. The method of claim 1, further comprising:

for the file map entry in the filesystem tree associated with the file clone:

removing the file map entry from the filesystem tree.

4. The method of claim 1, wherein the decrementing is performed when a cloned flag is set in the file map entry, wherein the file map entry includes a cloned flag and the cloned flag indicates that the file clone is a clone of another file.

5. The method of claim 1, wherein the reference count entry is added to the filesystem tree when the original file is cloned to produce the file clone.

6. The method of claim 1, wherein the data block is retained when the reference count is greater than zero.

7. The method of claim 1, wherein a plurality of reference count entries associated with the file clone are arranged contiguously in the filesystem tree using the key and the key further comprises an identification of the data block.

8. A non-transitory computer-readable storage medium containing instructions, that when executed, control a computer system to be operable for:

receiving an instruction to remove the file clone from the filesystem, wherein the file clone is a point-in-time copy of metadata of an original file;

for a file map entry in a filesystem tree associated with the file clone, the file map entry identifying a data block:

decrementing a reference count in a reference count entry associated with the file map entry, wherein the reference count entry is stored in the filesystem tree according to a key and the key comprises an identification of the original file; and reclaiming the data block in a storage system based on the reference count, wherein the data block is reclaimed when the reference count is zero.

9. The non-transitory computer-readable storage medium of claim 8, further operable for:

for the file map entry in the filesystem tree associated with the file clone:

reclaiming the physical block in the storage system associated with the file map entry further based on at least one snapshot of the filesystem tree, wherein the data block is reclaimed when the reference count is zero and the physical block is not shared with the at least one snapshot of the filesystem tree, wherein the previous snapshot and the next snapshot are a point-in-time copies of the filesystem tree.

10. The non-transitory computer-readable storage medium of claim 8, further operable for:

for the file map entry in the filesystem tree associated with the file clone:

removing the file map entry from the filesystem tree.

11. The non-transitory computer-readable storage medium of claim 8, wherein the decrementing is performed when a cloned flag is set in the file map entry, wherein the file map entry includes a cloned flag and the cloned flag indicates that the file clone is a clone of another file.

12. The non-transitory computer-readable storage medium of claim 8, wherein the reference count entry is added to the filesystem tree when the original file is cloned to produce the file clone.

13. The non-transitory computer-readable storage medium of claim 8, wherein the data block is retained when the reference count is greater than zero.

14. The non-transitory computer-readable storage medium of claim 8, wherein a plurality of reference count entries associated with the file clone are arranged contiguously in the filesystem tree using the key and the key further comprises an identification of the data block.

15. An apparatus comprising:

one or more computer processors; and a non-transitory computer-readable storage medium comprising instructions, that when executed, control the one or more computer processors to be operable for:

receiving an instruction to remove the file clone from the filesystem, wherein the file clone is a point-in-time copy of metadata of an original file;

for a file map entry in a filesystem tree associated with the file clone, the file map entry identifying a data block:

decrementing a reference count in a reference count entry associated with the file map entry, wherein the reference count entry is stored in the filesystem tree according to a key and the key comprises an identification of the original file; and reclaiming the data block in a storage system based on the reference count, wherein the data block is reclaimed when the reference count is zero.

16. The apparatus of claim 15, further operable for:

for the file map entry in the filesystem tree associated with the file clone:

reclaiming the physical block in the storage system associated with the file map entry further based on at least one snapshot of the filesystem tree, wherein the data block is reclaimed when the reference count is zero and the physical block is not shared with the at least one snapshot of the filesystem tree, wherein the previous snapshot and the next snapshot are a point-in-time copies of the filesystem tree.

17. The apparatus of claim 15, further operable for:

for the file map entry in the filesystem tree associated with the file clone:

removing the file map entry from the filesystem tree.

18. The apparatus of claim 15, wherein the decrementing is performed when a cloned flag is set in the file map entry, wherein the file map entry includes a cloned flag and the cloned flag indicates that the file clone is a clone of another file.

19. The apparatus of claim 15, wherein the reference count entry is added to the filesystem tree when the original file is cloned to produce the file clone.

20. The apparatus of claim 15, wherein the data block is retained when the reference count is greater than zero.

21. The apparatus of claim 15, wherein a plurality of reference count entries associated with the file clone are arranged contiguously in the filesystem tree using the key and the key further comprises an identification of the data block.

* * * * *